July 15, 1947.  W. E. EMERICK  2,424,155
PLOW
Filed June 26, 1944
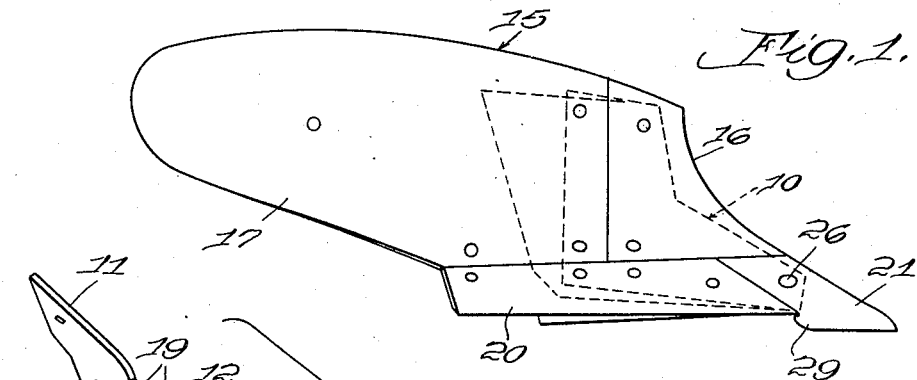
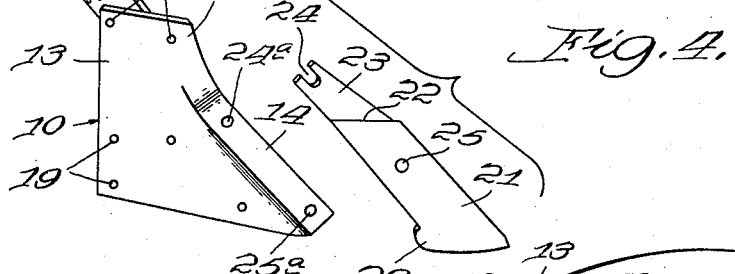
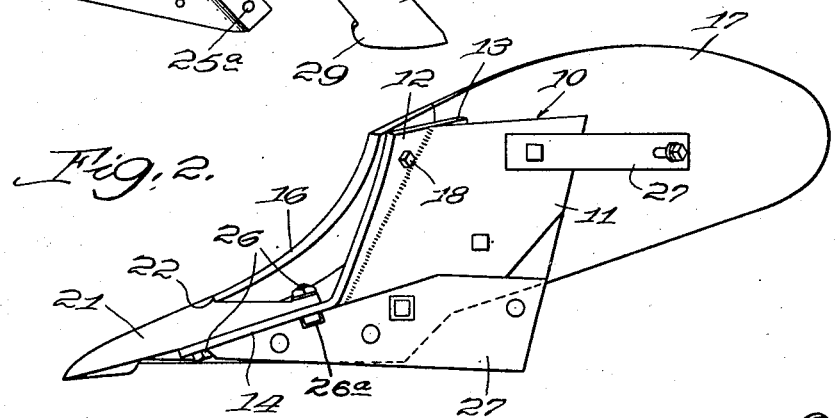
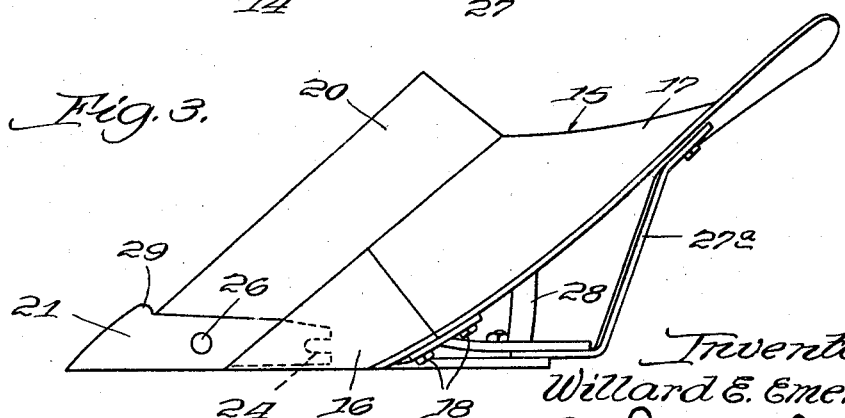
Inventor:
Willard E. Emerick.
By Paul O. Pippel
Atty.

Patented July 15, 1947

2,424,155

UNITED STATES PATENT OFFICE 2,424,155

PLOW

Willard E. Emerick, Canton, Ill., assignor to International Harvester Company, a corporation of New Jersey Application June 26, 1944, Serial No. 542,134

8 Claims. (Cl. 97—125)

This invention relates to agricultural implements and particularly to a plow for turning the soil.

An object of the invention is to provide a plow bottom having replaceable parts designed to lengthen the life of the plow.

Another object is to provide in a plow a share portion having a point adapted to wear sharp by usage and thus reduce the cost of resharpening.

Still another object is to provide a plow share having a replaceable point and means for protecting the juncture of the point and share against the destructive action of the soil.

A further object is to provide a plow composed of a plurality of replaceable sections and novel means for joining said sections.

Other objects and advantages will become clear from the following detailed description when read in conjunction with the accompanying drawings, wherein:

Fig. 1 is an elevation of a plow according to the present invention as viewed from the furrow-ward side;

Fig. 2 is an elevation of the plow shown in Fig. 1 from the land side;

Fig. 3 is a plan view of the pole shown in Fig. 2; and

Fig. 4 is a view of the supporting frog and detached plow point.

It will be noted that the plow, or plow bottom, includes a frog 10 generally T-shaped in cross-section to which the earth-turning elements of the plow are attached. This frog comprises a stem portion 11 and flange portions 12 and 13 extending from opposite sides thereof. Flange portion 12 has an angled offset wing 14, the function of which will hereinafter be set forth.

Flange portions 12 and 13 serve for the attachment of the separable plow elements, including a moldboard 15, which comprises a shin 16 and a rear moldboard portion 17. Shin 16 and moldboard 17 are attached to the frogs by bolts such as shown at 18. These bolts are preferably carried by the plow elements, and openings such as 19 in the frog are provided for the reception thereof. The manner in which the attachment of the plow elements to the frog is made is indicated in Figure 1, wherein the frog is shown in dotted lines.

It will be noted particularly well in Figs. 1 and 3 that the forward edge of rear moldboard portion 17 is a generally vertical line mating with the rear edge of shin 16. Thus, the rear edge of shin 16 and the forward edge of moldboard 17 are of substantially the same thickness so that the faces of these portions lie flush with each other. The lower edges of shin 16 and moldboard 17 are generally parallel to the ground when the plow is in operating position, as viewed in Fig. 1. Share 20 is likewise bolted to the frog 10 and has its upper edge of substantially the same thickness as the lower edges of the shin and moldboard, so that the edges lie flush and a smooth face is presented.

The forward edge of share 20 terminates short of the forward edge of shin 16 and a replaceable point 21 is provided, having a rear edge engaging the forward edge of share 20. The structure of point 21 is clearly indicated in the drawings. It is generally triangular in cross-section and includes a shoulder 22 and an offset portion 23 having an open ended slot 24 in the end thereof. The forward portion of the point is thickened and of such a contour that the cutting edge thereof wears sharp by usage. The point likewise tapers somewhat from the land side thereof to the edge adjacent the forward edge of the share. Upon attachment of the separable moldboard, shin, and share to the frog, the point 21 is positioned on the wing portion 14 of the frog, with the slot 24 in registry with an opening 24ª in the frog. Another opening 25 in the point is adapted to register with an opening 25ª in the frog. The offset portion 23 extends under the shin 16, and shoulder 22 abuts the overhanging lower edge of shin 16. The point is held in place by bolts 26, as indicated in Fig. 2 a cut-out portion 26ª being provided in the landside 21 to accommodate the head of one of the bolts.

The landside of point 21 lies flush with the outer edge of wing portion 14 of the frog and with a landside element 27 to secured to the lower portion of stem 11 of the frog.

Further bracing of the moldboard to the frog is provided by straps 27ª and 28.

It will be noted that the lower cutting edge of point 21 is generally parallel to the lower cutting edge of the share 20 and projects somewhat therebelow. Since the juncture of the point to the share is on an inclined line extending in the direction of travel when operating, it would normally be expected that dirt and other foreign matter would enter into the joint between these two elements and eventually wear away the edges thereof. In order to protect the plow against this eventuality, the point 21 is provided with a rearwardly extending lip portion 29, which extends beyond the juncture of the point with the share and effectively covers the juncture of these two elements, preventing foreign matter from forcing its way therebetween. The structure of the point and the manner in which the lip overlaps the forward edge of the share is shown particularly well in Figs. 1, 3, and 4.

Since all these plow elements are bolted to the frog, each element is individually separable therefrom and may be readily replaced when parts become worn. The forward cutting edges of the plow, as represented by the point 21 and the shin 16 are, of course, subject to a great extent to the erosive action of the soil. The share 20 is likewise subject to a considerable wear. Therefore, the importance of providing replaceable elements is obvious when considered from the standpoint of economy. Applicant has provided a novel plow construction consisting of a separable point, share, moldboard, and shin, the parts of which are readily replaced at a fraction of the entire cost of a plow, and in which the mating edge most likely to be damaged in the passage of the plow through the soil is fully protected against wear.

Having now described the invention, it may be understood that modifications may be made therein without departing from the spirit of the invention or the scope of the appended claims.

What is claimed is:

1. In a plow bottom, a moldboard portion, a share portion having a lower ground-contacting edge, a separable point having a rear edge coinciding with the forward edge of said share portion and a lower edge projecting below the lower edge of said share portion, and an extension on said point overlapping the juncture of said share and said point.

2. In a plow bottom, a supporting frog, a moldboard secured to the frog, a share secured to said frog below said moldboard, said frog having an offset wing portion extending beyond the end of said share, a detachable point having edges coinciding with said share and said moldboard, and an offset portion underlapping the moldboard and adapted to be secured to the wing portion of said frog.

3. In a plow bottom, a share, a moldboard having a lower edge extending forwardly beyond the upper edge of the share, a detachable point having an edge coinciding with the forward edge of the share, an edge coinciding with the adjacent lower edge of the moldboard, and an offset portion underlapping the moldboard, a frog affixed to the moldboard and having an offset wing portion spaced from the moldboard to receive the offset portion of the point, and means for fastening the point to the frog.

4. In a plow bottom, a moldboard portion, a share portion, a separable point having an edge coinciding with an edge of said share portion, and a lip on said point overlapping the juncture of said share and said point.

5. In a plow bottom, a moldboard, a separable share, a separable point on the share, and a lip on the point overlapping the juncture of said share and said point to protect said juncture against the entrance of foreign matter.

6. In a plow bottom adapted to open a furrow in the ground, a share, a separable point on the share, the line of juncture of point and share extending on a line upwardly and rearwardly with respect to the plow, and a rearwardly extending lip on the point overlapping the juncture of share and point.

7. In a plow bottom adapted to open a furrow in the ground, a share having a lower cutting edge, a separable point on the share having a lower cutting edge extending below the cutting edge of the share, and an extension projecting from the rear cutting edge of the point to protect the juncture of point and share from the entrance of foreign material.

8. In a plow bottom, a frog, a separable share having upper and lower edges generally parallel to the ground when in operating position, a moldboard having its lower edge flush with the upper edge of the share, a separable shin having its rear edge flush with the forward edge of the moldboard, a portion of its lower edge flush with the upper edge of the share and an overhanging portion, a separable point having its rear edge flush with the forward edge of the share, its upper edge flush with the overhanging portion of the shin, its lower cutting edge generally parallel to and extending below the lower edge of the share, and a rearward extension on the lower edge of the point projecting beyond the forward edge of the share for protecting the juncture of share and point against the entrance of foreign matter.

WILLARD E. EMERICK.

REFERENCES CITED

The following references are of record in the file of this patent:

UNITED STATES PATENTS

| Number | Name | Date |
|---|---|---|
| 321,187 | Casaday | June 30, 1885 |
| 679,014 | Boger | July 23, 1901 |
| 2,312,371 | Strandlund | Mar. 2, 1943 |
| 1,327,921 | Lee | Jan. 13, 1920 |
| 1,692,086 | Jakobsen | Nov. 20, 1928 |
| 2,347,167 | Baker | Apr. 25, 1944 |
| 275,972 | Anderson | Apr. 17, 1883 |
| 544,944 | Pirch | Aug. 20, 1895 |
| 2,154,973 | Chibnik | Apr. 18, 1939 |